(12) United States Patent
Abe

(10) Patent No.: US 11,754,911 B2
(45) Date of Patent: Sep. 12, 2023

(54) IMAGING APPARATUS AND MOBILE OBJECT

(71) Applicant: KYOCERA Corporation, Kyoto (JP)

(72) Inventor: Hiroyuki Abe, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/754,048

(22) PCT Filed: Sep. 8, 2020

(86) PCT No.: PCT/JP2020/033939
§ 371 (c)(1),
(2) Date: Mar. 22, 2022

(87) PCT Pub. No.: WO2021/059965
PCT Pub. Date: Apr. 1, 2021

(65) Prior Publication Data
US 2022/0334455 A1 Oct. 20, 2022

(30) Foreign Application Priority Data

Sep. 26, 2019 (JP) ................................ 2019-176130

(51) Int. Cl.
*G03B 17/55* (2021.01)
*G03B 17/12* (2021.01)
*H04N 23/52* (2023.01)

(52) U.S. Cl.
CPC ............. *G03B 17/55* (2013.01); *G03B 17/12* (2013.01); *H04N 23/52* (2023.01)

(58) Field of Classification Search
CPC ........ G02B 7/025; G03B 11/04; G03B 17/02; G03B 17/12; G03B 17/55; H04N 23/51; H04N 23/52; H04N 23/54; H04N 23/55
See application file for complete search history.

(56) References Cited

U.S. PATENT DOCUMENTS 9,769,361 B2 * 9/2017 Lee ..................... H04N 23/51
11,141,071 B2 * 10/2021 Moore ................ A61B 5/0205
(Continued)

FOREIGN PATENT DOCUMENTS

JP 2006-295714 A 10/2006

*Primary Examiner* — Amy R Hsu
(74) *Attorney, Agent, or Firm* — Studebaker & Brackett PC

(57) ABSTRACT

An imaging apparatus includes an imaging optical system. The imaging apparatus includes a holding member that holds the imaging optical system. The imaging apparatus includes an imaging device including a light-receiving region and located in an image-forming plane of the imaging optical system. The imaging apparatus includes an elastic member that is located close to the imaging device toward the imaging optical system and surrounds the light-receiving region without overlapping the light-receiving region when viewed in an optical axial direction of the imaging optical system. The elastic member is in contact with the imaging device such that the area of contact between the elastic member and the imaging device is ring-shaped. The imaging apparatus includes a plate-like member that is located farther from an optical axis of the imaging optical system than an inside perimeter of the elastic member and overlaps at least part of the elastic member when viewed in the optical axial direction of the imaging optical system. The plate-like member includes a portion in contact with the holding member and a portion in contact with the elastic member.

10 Claims, 4 Drawing Sheets

(56) References Cited

U.S. PATENT DOCUMENTS

2006/0245050 A1* 11/2006 Uchida ............ H01L 27/14618
                                                                359/391
2016/0352985 A1* 12/2016 Park ....................... H04N 23/54
2018/0345911 A1* 12/2018 Zurowski ............... G03B 17/55
2018/0367767 A1* 12/2018 MacKinnon ......... H04N 25/709

* cited by examiner

IMAGING APPARATUS AND MOBILE OBJECT

CROSS-REFERENCE TO RELATED APPLICATION

The present application claims priority to Japanese Patent Application No. 2019-176130, filed on Sep. 26, 2019, the content of which is incorporated by reference herein in its entirety.

TECHNICAL FIELD

The present disclosure relates to an imaging apparatus and a mobile object.

BACKGROUND ART

A known imaging apparatus is assembled in which an opening of a dust-proofing and light-shielding member is accurately positioned with respect to an imaging device (see, for example, Patent Literature 1).

CITATION LIST

Patent Literature

PTL 1: Japanese Unexamined Patent Application Publication No. 2006-295714

SUMMARY OF INVENTION

An imaging apparatus according to an embodiment of the present disclosure includes an imaging optical system, a holding member, an imaging device, an elastic member, and a plate-like member. The imaging optical system includes at least one optical member. The holding member holds the imaging optical system. The imaging device includes a light-receiving region. The imaging device is located in an image-forming plane of the imaging optical system. The elastic member is located close to the imaging device toward the imaging optical system. The elastic member surrounds the light-receiving region without overlapping the light-receiving region when viewed in an optical axial direction of the imaging optical system. The elastic member is in contact with the imaging device such that an area of contact between the elastic member and the imaging device is ring-shaped. The plate-like member is located farther from an optical axis of the imaging optical system than an inside perimeter of the elastic member and overlaps at least part of the elastic member when viewed in the optical axial direction of the imaging optical system. The plate-like member includes a portion in contact with the holding member and a portion in contact with the elastic member.

A mobile object according to another embodiment of the present disclosure includes an imaging apparatus installed therein. The imaging apparatus includes an imaging optical system, a holding member, an imaging device, an elastic member, and a plate-like member. The imaging optical system includes at least one optical member. The holding member holds the imaging optical system. The imaging device includes a light-receiving region. The imaging device is located in an image-forming plane of the imaging optical system. The elastic member is located close to the imaging device toward the imaging optical system. The elastic member surrounds the light-receiving region without overlapping the light-receiving region when viewed in an optical axial direction of the imaging optical system. The elastic member is in contact with the imaging device such that an area of contact between the elastic member and the imaging device is ring-shaped. The plate-like member is located farther from an optical axis of the imaging optical system than an inside perimeter of the elastic member and overlaps at least part of the elastic member when viewed in the optical axial direction of the imaging optical system. The plate-like member includes a portion in contact with the holding member and a portion in contact with the elastic member.

DESCRIPTION OF EMBODIMENTS

Figure 1:
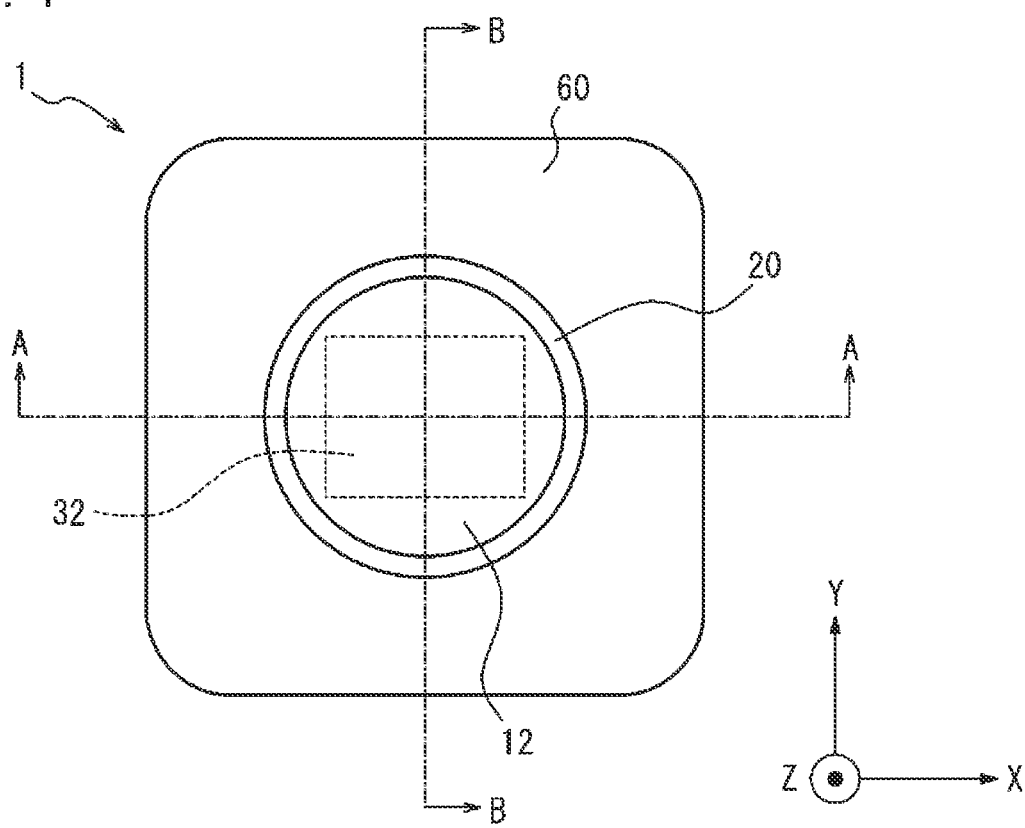
FIG. 1 is a plan view of an imaging apparatus according to an embodiment, illustrating an example of the configuration of the imaging apparatus.

There has been a demand that imaging devices be shielded from dust and light and be capable of dissipating heat. An imaging apparatus and a mobile object according to an embodiment of the present disclosure can provide shielding to prevent entry of dust and light and enable dissipation of heat.

Referring to FIGS. 1 to 5, an imaging apparatus 1 according to an embodiment includes an imaging optical system 10, a holding member 20, an imaging substrate 30, an elastic member 40, a plate-like member 50, and a housing 60. The imaging optical system 10, the holding member 20, the imaging substrate 30, the elastic member 40, and the plate-like member 50 are accommodated in the housing 60. The housing 60 may be made of a material such as resin. The housing 60 may be made of resin or may be made of various materials.

Figure 3:
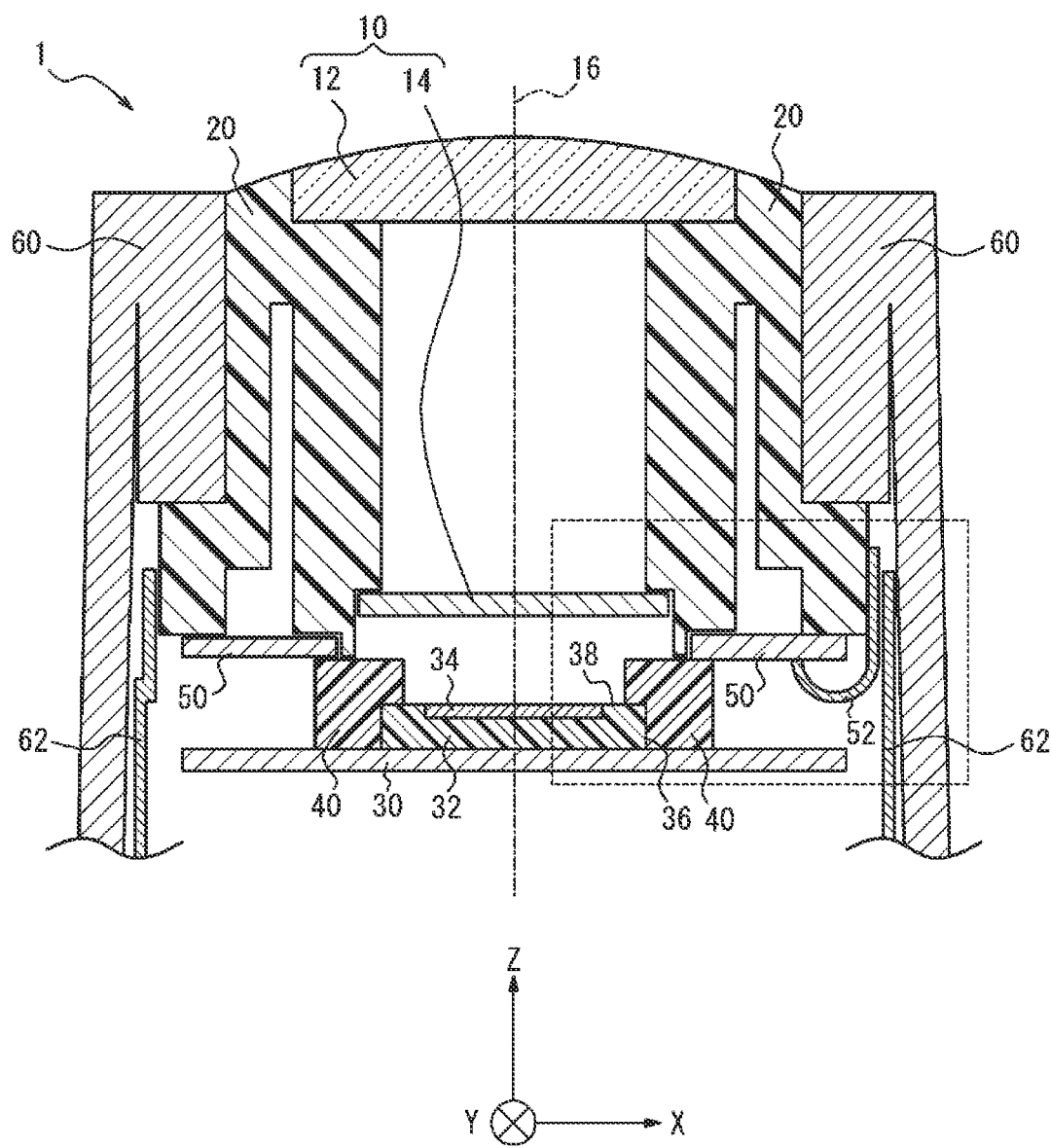
FIG. 3 is a sectional view taken along line A-A in FIG. 1.
Figure 5:
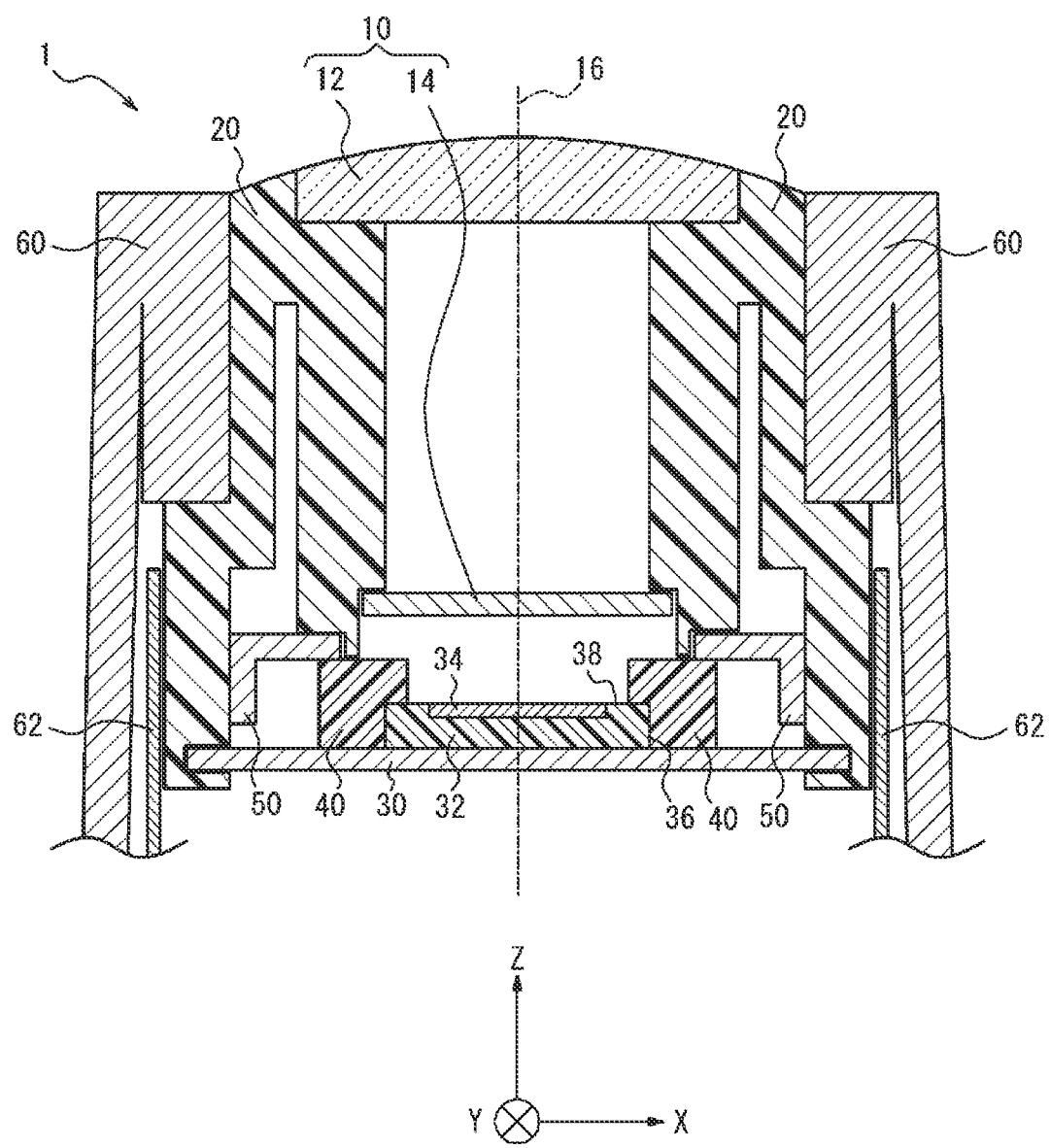
FIG. 5 is a sectional view taken along line B-B in FIG. 1.

As illustrated in FIGS. 1, 3, and 5, the imaging optical system 10 includes a lens 12. Dash-dot lines in FIGS. 3 and 5 each denote an optical axis 16 of the lens 12. As illustrated in FIGS. 3 and 5, the imaging optical system 10 may also include an optical filter 14. The lens 12 and the optical filter 14 are also referred to as optical members. The imaging optical system 10 includes at least one optical member. The lens 12 of the imaging optical system 10 forms an object image incident on the imaging apparatus 1.

The holding member 20 holds the lens 12 and the optical filter 14. The lens 12 is joined to the holding member 20. Two or more lenses 12, instead of the lens 12, may be included. At least one of such lenses 12 may be replaced with another optical member, such as a mirror. The lens 12 may be bonded to the holding member 20 with, for example, an adhesive. The lens 12 may be joined to the holding member 20 via a fitting structure. The lens 12 may be joined to the holding member 20 by fastening with screws or the like.

The optical filter 14 may include, for example, an infrared (IR) cut filter. The optical filter 14 is joined to the holding member 20. When the optical filter 14 is closest, among the optical members, to an imaging device 32, the optical filter 14 and the holding member 20 perform the function of sealing the imaging device 32. In this case, the optical filter 14 is joined to the holding member 20 so as to prevent entry of foreign matter such as water and dust between the optical filter 14 and the holding member 20.

Two or more optical filters 14, instead of the optical filter 14, may be included. The optical filters 14 may be bonded to the holding member 20 with, for example, an adhesive. The holding member 20 may be made of a material such as resin. The holding member 20 may be made of resin or may be made of various materials.

As illustrated in FIG. 3, the imaging device 32 is mounted on the imaging substrate 30. The imaging device 32 includes a light-receiving region 34 in an upper surface 38 of the imaging device 32. The imaging device 32 is mounted on the imaging substrate 30 such that the light-receiving region 34 faces the imaging optical system 10. In addition to the imaging device 32, a circuit for processing data output from the imaging device 32 may be mounted on the imaging substrate 30. The imaging substrate 30 may, for example, be a printed circuit board.

The imaging substrate 30 is joined to the holding member 20. The imaging substrate 30 may be bonded to the holding member 20 with, for example, an adhesive. The imaging substrate 30 may be joined to the holding member 20 via a fitting structure. The imaging substrate 30 may be joined to the holding member 20 by fastening with screws or the like.

The imaging device 32 is disposed so that the light-receiving region 34 is located in an image-forming plane of the imaging optical system 10. An object image formed in the light-receiving region 34 by the imaging optical system 10 is captured by the imaging device 32. The imaging device 32 may, for example, be a complementary metal oxide semiconductor (CMOS) image sensor or a charge-coupled device (CCD).

Figure 2:
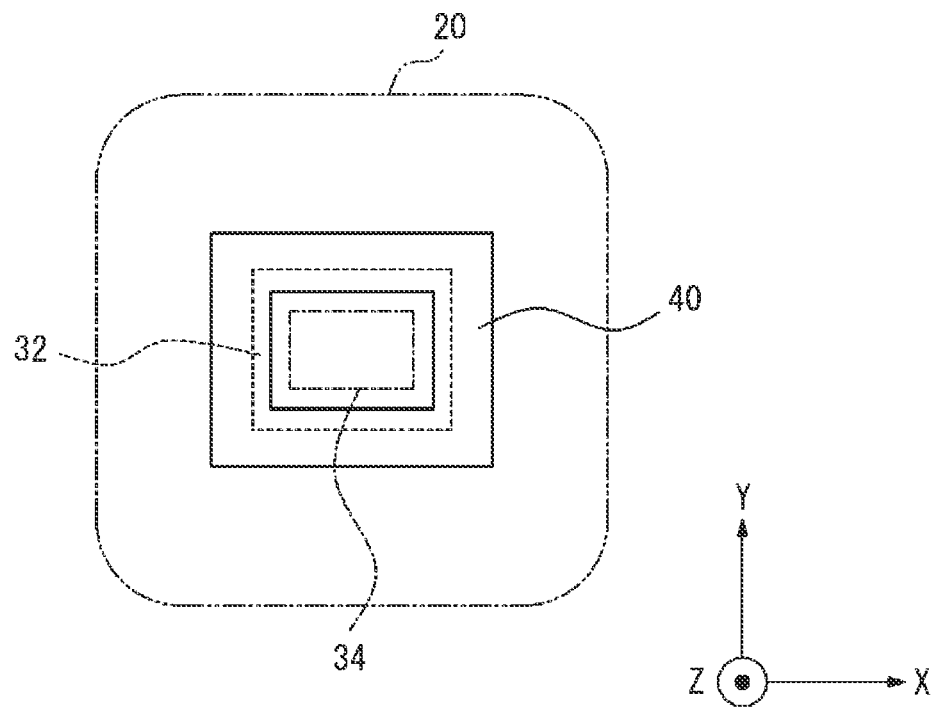
FIG. 2 is a plan view, illustrating an example of the configuration inside both a housing and a holding member.
Figure 4:
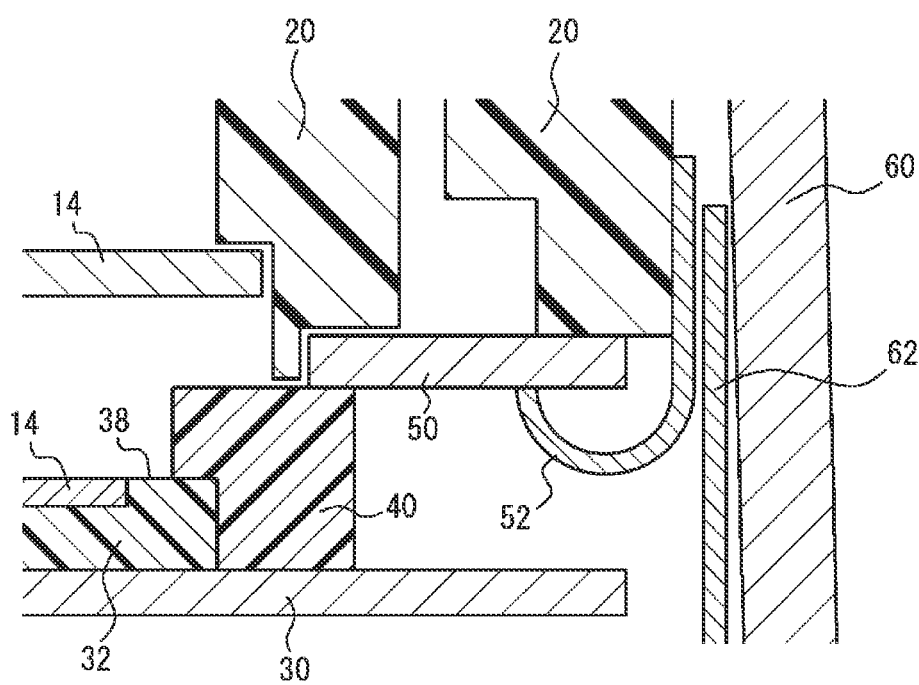
FIG. 4 is an enlarged view of a region enclosed with a broken line in FIG. 3.
Figure 4:
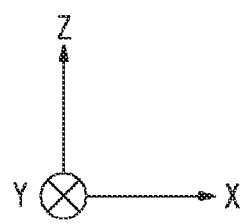

As illustrated in FIG. 2, the elastic member 40 surrounds the light-receiving region 34 of the imaging device 32 without overlapping the light-receiving region 34 when viewed in the direction of the optical axis 16 of the lens 12. The elastic member 40 is in contact with the upper surface 38 of the imaging device 32 and is shaped like a ring extending along the periphery of the light-receiving region 34. The direction of the optical axis 16 is also referred to as an optical axial direction. As illustrated in FIGS. 3, 4, and 5, the elastic member 40 is located between the holding member 20 and the imaging device 32. The elastic member 40 may be in contact with the holding member 20 such that the area of contact between them is ring-shaped. The elastic member 40, together with the holding member 20 and the upper surface 38 of the imaging device 32, seals the light-receiving region 34 of the imaging device 32. The light-receiving region 34 of the imaging device 32 may thus be shielded from dust and light even further.

The elastic member 40 may be in contact with an optical member that is closest, among optical members of the imaging optical system 10, to the imaging device 32. In other words, the elastic member 40 may be in contact with at least one of the holding member 20 and the optical member that is closest, among the optical members, to the imaging device 32. For example, the elastic member 40 may be in contact with the optical filter 14. In this case, the elastic member 40 and the optical filter 14 seal the light-receiving region 34 of the imaging device 32.

The elastic member 40 may be made of, for example, silicone-based resin. The thermal conductivity of silicone-based resin is higher than polypropylene foam. When the elastic member 40 is made of a material of relatively high thermal conductivity, the diffusion of heat generated by the imaging device 32 into the holding member 20 through the elastic member 40 is promoted. The thermal dissipation properties of the imaging device 32 may be improved accordingly.

As illustrated in FIGS. 3, 4, and 5, the elastic member 40 may also be in contact with a side surface 36 of the imaging device 32. In this case, the diffusion of heat from the imaging device 32 and into the elastic member 40 is promoted even further as compared to the case where the elastic member 40 is not in contact with the side surface 36. The thermal dissipation properties of the imaging device 32 may be improved accordingly.

As illustrated in FIGS. 3, 4, and 5, the plate-like member 50 is located farther from the optical axis 16 than the inside perimeter of the elastic member 40 and overlaps at least part of the elastic member 40 when viewed in the direction of the optical axis 16 of the lens 12. The plate-like member 50 includes a portion in contact with the holding member 20 and a portion in contact with the elastic member 40. The contact between the plate-like member 50 and the elastic member 40 promotes the diffusion of heat generated by the imaging device 32 through the elastic member 40 and into the plate-like member 50. The contact between the plate-like member 50 and the holding member 20 further promotes the diffusion of heat into the holding member 20.

The plate-like member 50 extends along the periphery of the light-receiving region 34 of the imaging device 32. The plate-like member 50 may be shaped like a ring extending along the periphery of the light-receiving region 34. The plate-like member 50 may be composed of two or more pieces disposed along the periphery of the light-receiving region 34. The plate-like member 50 may be disposed in part of the region in which the elastic member 40 and the holding member 20 are in contact with each other along the periphery of the light-receiving region 34. In this case, together with the holding member 20 and the elastic member 40, the plate-like member 50 disposed as above seals the light-receiving region 34 of the imaging device 32.

The plate-like member 50 may be made of a material whose thermal conductivity is higher than the thermal conductivity of the elastic member 40. The plate-like member 50 may be made of, for example, metal or may be made of a carbon-based material, such as a graphite sheet. Examples of the material of the plate-like member 50 are not limited to the above. The plate-like member 50 may be made of various materials that are more thermally conductive than the elastic member 40.

As illustrated in FIGS. 3, 4, and 5, the housing 60 may include a shielding portion 62. The shielding portion 62 is made of a conductive material such as metal. The shielding portion 62 is disposed so as to surround the imaging device 32 and is electrically connected to the ground point of the imaging apparatus 1 to provide electrostatic shielding for the imaging device 32.

As illustrated in FIG. 5, the plate-like member 50 may be disposed so as to cover at least part of the side surface 36 of the imaging device 32. The plate-like member 50 disposed as above can provide electrostatic shielding for the imaging device 32.

As illustrated in FIGS. 3 and 4, the plate-like member 50 includes a bent portion 52. The bent portion 52 may be obtained by partially bending the plate-like member 50. The bent portion 52 is in contact with the housing 60. The bent portion 52 may be in contact with the housing 60 with the shielding portion 62 therebetween or may be in contact with the housing 60 without the shielding portion 62 therebetween. The bent portion 52 in contact with the housing 60 promotes diffusion of heat from the imaging device 32 to the plate-like member 50 further into the housing 60. The thermal dissipation properties of the imaging device 32 may be improved accordingly.

The imaging apparatus 1 according to the present disclosure may be installed in a mobile object. The mobile object referred to in the present disclosure may be a vehicle, a ship, or an aircraft. Examples of the vehicle referred to in the present disclosure include automobiles and industrial vehicles and may also include rail cars, vehicles for non-industrial use, and fixed-wing aircrafts that run along runways. The vehicles include passenger cars, trucks, buses, two-wheelers, trolley buses, and other vehicles that travel on roads. The industrial vehicles include agricultural vehicles and construction vehicles. The industrial vehicles include forklifts and golf carts but are not limited to these examples. The industrial vehicles for agricultural use include tractors, cultivators, transplanters, binders, combines, and lawn mowers but are not limited to these examples. The industrial vehicles for construction work include bulldozers, scrapers, excavators, crane trucks, dump trucks, and road rollers but are not limited to these examples. The vehicles also include man-powered vehicles. The classification of vehicles is not limited to the above. For example, automobiles may include industrial vehicles that can travel on roads; that is, the same vehicle may be put into different classifications. Examples of the ship referred to in the present disclosure include personal watercrafts, boats, and tankers. Examples of the aircraft referred to in the present disclosure include fixed-wing aircrafts and rotary wing aircrafts.

The accompanying drawings are schematic representations of an embodiment of the present disclosure. Constituent elements are not drawn to scale, and the dimension ratios thereof are not necessarily fully corresponding to the actual dimension ratios.

Although an embodiment of the present disclosure has been described above with reference to the accompanying drawings and by way of examples, various alterations or modifications may be made by those skilled in the art. It is to be understood that such alterations and modifications fall within the scope of the present disclosure. For example, functions and the like of each constituent part or each step can be rearranged in any way that involves no logical inconsistency, and constituent parts or steps can be combined into one or divided. While the present disclosure has been described above with a focus on an embodiment in the form of an apparatus, the present disclosure may be embodied in the form of a method that includes steps performed by constituent parts of an apparatus.

Furthermore, the present disclosure may be embodied in the form of a method or program executed by a processor included in an apparatus or may be embodied in the form of a recording medium on which a program is recorded. It is to be understood that such embodiments also fall within the scope of the present disclosure.

The words "first", "second", and so on in the present disclosure are identifiers for distinguishing between constituent elements. With the constituent elements being distinguishable by "first", "second", and so on in the present disclosure, the identifiers assigned to these constituent elements are interchangeable. For example, the identifiers "first" and "second" that are assigned to the respective lenses are interchangeable. The identifiers are to be interchanged all at once. The elements remain distinguishable from each other after interchanges of identifiers. The identifiers may be omitted. Constituent elements from which the identifiers are omitted are distinguished by reference signs. In the present disclosure, the identifiers "first", "second" and so on should not be used for interpretation of the order of the constituent elements or should not be used as grounds for the presence of lower numbered identifiers.

In the present disclosure, the X-axis, the Y-axis, and the Z-axis are provided for convenience of illustration and are interchangeable. Constituent elements referred to in the present disclosure have been described using the Cartesian coordinate system based on coordinate axes: the X-axis, the Y-axis, and the Z-axis. It is not required that the constituent elements referred to the present disclosure be orthogonal to each other.

The invention claimed is:

1. An imaging apparatus, comprising:
    an imaging optical system including at least a first optical member and a second optical member;
    a holding member that holds the imaging optical system;
    an imaging device that includes a light-receiving region and is located in an image-forming plane of the imaging optical system;
    an elastic member that surrounds the light-receiving region without overlapping the light-receiving region when viewed in an optical axial direction of the imaging optical system, the elastic member being in contact with the imaging device such that an area of contact between the elastic member and the imaging device is ring-shaped; and
    a plate-like member that is located farther from an optical axis of the imaging optical system than an inside perimeter of the elastic member, and that overlaps at least part of the elastic member when viewed in the optical axial direction of the imaging optical system, the plate-like member including a portion in contact with the holding member and a portion in contact with the elastic member,
    wherein the second optical member is closer to the imaging device than the first optical member, and the second optical member is joined to the holding member at a separated distance above the imaging device.

2. The imaging apparatus according to claim 1, wherein the elastic member is in contact with at least one of the holding member and the second optical member.

3. The imaging apparatus according to claim 1, wherein the elastic member is in contact with at least part of a side surface of the imaging device.

4. The imaging apparatus according to claim 2, wherein the elastic member is in contact with at least part of a side surface of the imaging device.

5. The imaging apparatus according to claim 1, wherein the plate-like member covers at least part of a side surface of the imaging device.

6. The imaging apparatus according to claim 2, wherein the plate-like member covers at least part of a side surface of the imaging device.

7. The imaging apparatus according to claim 3, wherein the plate-like member covers the at least part of the side surface of the imaging device.

8. The imaging apparatus according to claim 4, wherein the plate-like member covers the at least part of the side surface of the imaging device.

9. The imaging apparatus according to claim 1, further comprising
    a housing in which the imaging optical system, the holding member, the imaging device, the elastic member, and the plate-like member are accommodated, wherein
    at least part of the plate-like member is in contact with the housing.

10. A mobile object in which an imaging apparatus is installed, the imaging apparatus comprising
an imaging optical system including at least a first optical member and a second optical member,
a holding member that holds the imaging optical system,
an imaging device that includes a light-receiving region and is located in an image-forming plane of the imaging optical system,
an elastic member that surrounds the light-receiving region without overlapping the light-receiving region when viewed in an optical axial direction of the imaging optical system, the elastic member being in contact with the imaging device such that an area of contact between the elastic member and the imaging device is ring-shaped, and
a plate-like member that is located farther from an optical axis of the imaging optical system than an inside perimeter of the elastic member, and that overlaps at least part of the elastic member when viewed in the optical axial direction of the imaging optical system, the plate-like member including a portion in contact with the holding member and a portion in contact with the elastic member,
wherein the second optical member is closer to the imaging device than the first optical member, and the second optical member is joined to the holding member at a separated distance above the imaging device.

* * * * *